United States Patent
Katsumi et al.

(10) Patent No.: US 9,746,197 B2
(45) Date of Patent: Aug. 29, 2017

(54) BATHROOM AIR-CONDITIONER

(75) Inventors: Yoshimasa Katsumi, Aichi (JP); Yoshihiro Nishizuru, Aichi (JP); Kazuhiro Saitou, Aichi (JP); Mitunori Matubara, Gifu (JP); Masafumi Tsubouchi, Aichi (JP); Yuuji Sugata, Aichi (JP); Hiroshi Tsuihiji, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2446 days.

(21) Appl. No.: 12/519,645

(22) PCT Filed: Jan. 29, 2008

(86) PCT No.: PCT/JP2008/000103
§ 371 (c)(1),
(2), (4) Date: Jun. 17, 2009

(87) PCT Pub. No.: WO2008/093497
PCT Pub. Date: Aug. 7, 2008

(65) Prior Publication Data
US 2010/0024106 A1 Feb. 4, 2010

(30) Foreign Application Priority Data
Jan. 30, 2007 (JP) .................. 2007-018909
Mar. 19, 2007 (JP) .................. 2007-070178

(51) Int. Cl.
*F24F 11/00* (2006.01)
*F24D 5/12* (2006.01)
(Continued)

(52) U.S. Cl.
CPC ............ *F24F 11/0001* (2013.01); *F24D 5/12* (2013.01); *F24D 15/04* (2013.01); *F24F 12/003* (2013.01);
(Continued)

(58) Field of Classification Search
CPC ........ F25D 5/04; F25D 15/04; F25D 2200/12; F24F 7/08; F24F 12/003; F24F 11/001;
(Continued)

(56) References Cited

U.S. PATENT DOCUMENTS 2,401,560 A * 6/1946 Graham et al. ............... 165/59
2,896,428 A * 7/1959 Paton ..................... F24F 1/02
165/48.1
(Continued)

FOREIGN PATENT DOCUMENTS

CN 1737441 2/2006
CN 1766449 5/2006
(Continued)

OTHER PUBLICATIONS

International Search Report of PCT Application No. PCT/JP2008/000103 dated on May 1, 2008.

*Primary Examiner* — Cassey D Bauer
(74) *Attorney, Agent, or Firm* — Panasonic IP Management; Kerry S. Culpepper

(57) ABSTRACT

A bathroom air-conditioner includes a refrigerant circuit in which a compressor, a radiator, a decompressing mechanism and a heat absorber are connected with one another through a pipe, a circulating air-course, and a ventilating air-course. In the circulating air-course, the radiator and a circulating fan for circulating the air of the bathroom are placed. In the ventilating air-course, the heat absorber and a ventilating fan for discharging the air from the bathroom to the outside are placed. The heat absorber makes the refrigerant absorb heat from the air of the bathroom, and the radiator makes the refrigerant dissipate heat to the air of the bathroom for heating the bathroom. During the heating of the bathroom,
(Continued)

when a temperature of the bathroom becomes higher than a given temperature, a controller reduces an air-blow amount from the ventilating fan.

19 Claims, 11 Drawing Sheets

(51) Int. Cl.
  *F24D 15/04* (2006.01)
  *F24F 12/00* (2006.01)
  *F24D 5/04* (2006.01)
  *F24F 7/00* (2006.01)

(52) U.S. Cl.
  CPC ............ *F24D 5/04* (2013.01); *F24D 2200/12* (2013.01); *F24D 2200/22* (2013.01); *F24F 2007/001* (2013.01); *Y02B 10/70* (2013.01); *Y02B 30/12* (2013.01); *Y02B 30/52* (2013.01); *Y02B 30/563* (2013.01)

(58) Field of Classification Search
  CPC ......... F24F 11/0012; F25B 13/00; F24D 5/04; F24D 15/04; F24D 2200/12
  USPC ........... 62/180, 186, 259.1, 259.2, 263, 498; 165/247, 48.1; 4/213; 361/697
  See application file for complete search history.

(56) References Cited

U.S. PATENT DOCUMENTS

| | | | | |
|---|---|---|---|---|
| 3,070,972 | A * | 1/1963 | Atchison | 62/180 |
| 3,890,798 | A * | 6/1975 | Fujimoto et al. | 62/155 |
| 3,949,809 | A * | 4/1976 | Gilles | 165/210 |
| 4,018,266 | A * | 4/1977 | Kay | 165/237 |
| 5,934,362 | A * | 8/1999 | Barker, II | 165/48.1 |
| 7,721,561 | B2 * | 5/2010 | Kim | 62/186 |
| 2004/0246677 | A1 * | 12/2004 | Chen | 361/697 |
| 2005/0257538 | A1 * | 11/2005 | Hwang et al. | 62/179 |
| 2006/0032255 | A1 | 2/2006 | Hwang et al. | |

FOREIGN PATENT DOCUMENTS

| | | |
|---|---|---|
| JP | 44-6693 | 3/1969 |
| JP | 55-114433 U | 8/1980 |
| JP | 3-233250 | 10/1991 |
| JP | 11-23109 | 1/1999 |
| JP | 2002-333235 | 11/2002 |
| JP | 2002-333235 A | 11/2002 |
| JP | 2003-343892 A | 12/2003 |
| JP | 2005-55109 | 3/2005 |
| JP | 2005-055109 A | 3/2005 |
| JP | 2005-180712 | 7/2005 |
| JP | 2005-180712 A | 7/2005 |

* cited by examiner

FIG. 2

|  | Ventilating operation | Heating operation | Cooling operation |
|---|---|---|---|
| Circulating fan | halt | operate | operate |
| Ventilating fan | operate | operate | operate |
| compressor | halt | operate | operate |
| Flow-path switching valve | — | Heating cycle | Cooling cycle |

BATHROOM AIR-CONDITIONER

TECHNICAL FIELD

The present invention relates to a bathroom air-conditioner for air-conditioning a bathroom by using a heat pump.

BACKGROUND ART

A conventional bathroom air-conditioner using a heat pump has worked this way: A first heat exchanger of the heat pump radiates or absorbs heat to/from the air drawn from the outside of the bathroom, and then blows out the air into the bathroom. A second heat exchanger of the heat pump absorbs or radiates heat from/to air evacuated from the bathroom to the outdoors. The bathroom has been thus air-conditioned (refer to, e.g. Patent Document 1).

The foregoing air-conditioner collects the heat from the air to be discharged from the bathroom to the outdoor, and gives heat to another air drawn from a place other than the bathroom, thereby air-conditioning the bathroom. A continuous operation of this air-conditioner sometimes generates a difference in enthalpy between the air drawn from a place other than the bathroom and the air in the bathroom. In such a case, a part of the heat having undergone the air-conditioning of the bathroom leaks to the outdoor, so that a loss in heat collection becomes greater, and the efficiency of the air-conditioner lowers.

Patent Document 1: Unexamined Japanese Patent Application Publication No. 2005-180712

DISCLOSURE OF INVENTION

The bathroom air-conditioner of the present invention comprises the following elements:

a refrigerant circuit which connects a compressor for compressing refrigerant, a radiator for making the refrigerant dissipate heat to supplied air, a decompressing mechanism for making the refrigerant expand to decompress, and a heat absorber for absorbing heat from the supplied air, with one another through a pipe;

a circulating air-course running from an intake port open to the bathroom for drawing the air in the bathroom to a blowout port open to the bathroom at a different place from the intake port for blowing out the air to the bathroom; and a ventilating air-course running from the intake port to an outdoor blowout port which blows out the air in the bathroom to the outdoor.

The radiator and a circulating fan, which circulates the air of the bathroom, are placed in the circulating air-course, and the heat absorber and a ventilating fan, which discharges the air of the bathroom to the outdoor, are placed in the ventilating air-course. The heat absorber has the refrigerant absorb the heat from the air to be discharged from the bathroom to the outdoor, and the radiator has the refrigerant radiate the heat to the air in the bathroom, i.e. the air-conditioner is in the heating operation. During this heating operation, when a temperature of the bathroom rises higher than a predetermined temperature, a controller can reduce an air-blow amount supplied by the ventilating fan.

This control allows reducing an air volume supplied to the heat absorber, so that enthalpy efficiency in the heat absorber can be increased. The loss in heat collection from the air to be discharged from the bathroom to the outside can be thus reduced, so that energy efficiency improves, and an air volume drawn through a louver provided to the bathroom door can be reduced. As a result, the load of heating is reduced, and the bathroom air-conditioner can implement an efficient heating operation.

The bathroom air-conditioner of the present invention comprises the following elements:

a refrigerant circuit which connects a compressor for compressing refrigerant, a radiator for making the refrigerant dissipate heat to supplied air, a decompressing mechanism for making the refrigerant expand to decompress, and a heat absorber for absorbing heat from the supplied air, with one another through a pipe;

a circulating air-course running from an intake port open to a bathroom for drawing the air from the bathroom to a blowout port which is open to the bathroom at a different place from the intake port for blowing out the air to the bathroom; and a ventilating air-course running from the intake port to an outdoor blowout port which blows out the air from the bathroom to the outdoor.

The heat absorber and a circulating fan, which circulates the air of the bathroom, are placed in the circulating air-course. The radiator and a ventilating fan, which discharges the air of the bathroom to the outdoor, are placed in the ventilating air-course. The heat absorber makes the refrigerant absorb heat from the air in the bathroom, and the radiator makes the refrigerant dissipate heat to the air to be discharged from the bathroom to the outdoor for cooling the bathroom. During this cooling operation, when the temperature of the bathroom becomes lower than a predetermined temperature, a controller can reduce an air-blow amount supplied from the ventilating fan. This control allows a reduction an air volume supplied to the radiator, so that enthalpy efficiency in the radiator can be increased, and a loss in heat dissipation to the air discharged from the bathroom to the outside can be reduced. The energy efficiency can be thus improved, and the air volume drawn through the louver provided to the bathroom door can be reduced. As a result, the load of the cooling is reduced, and the bathroom air-conditioner can implement an efficient cooling operation.

BRIEF DESCRIPTION OF DRAWINGS

FIG. 2 shows the bathroom air-conditioner in operation according to its operation pattern.

Figure 1:
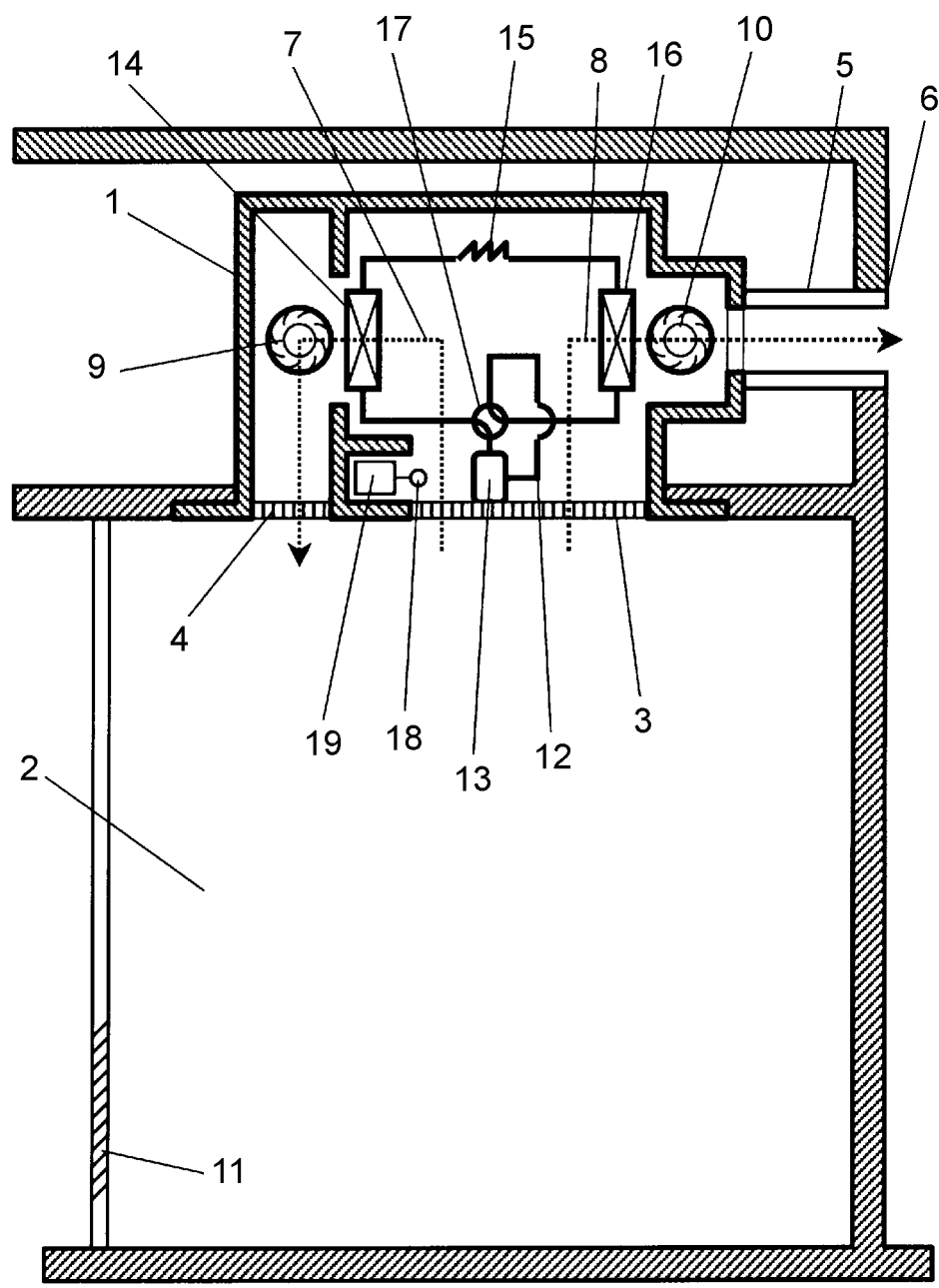
FIG. 1 shows an air-course and a refrigerant circuit of a bathroom air-conditioner in accordance with a first embodiment of the present invention.

DESCRIPTION OF REFERENCE MARKS 1 main unit
2 bathroom
3 intake port
4 blowout port
5 evacuating duct
6 outer blowout port
7 circulating air-course
8 ventilating air-course
9 circulating fan
10 ventilating fan
12 refrigerant circuit
13 compressor
15 decompressing mechanism
19, 54 controller
23 radiator
24 heat absorber

PREFERRED EMBODIMENTS FOR CARRYING OUT THE INVENTION

Exemplary embodiments of the present invention are demonstrated hereinafter with reference to the accompanying drawings.

Embodiment 1

FIG. 1 shows an air-course and a refrigerant circuit of a bathroom air-conditioner in accordance with the first embodiment of the present invention. As shown in FIG. 1, main unit 1 of the bathroom air-conditioner is placed under the roof of the bathroom, and includes intake port 3 and blowout port 4 open on its underside so that they communicate with bathroom 2. The intake port 3 and blowout port 4 open to bathroom 2 at different places from each other. A first end of evacuating duct 5 is connected to main unit 1, and a second end thereof communicates with outer blowout port 6. Circulating air-course 7 and ventilating air-course 8 are formed in main unit 1, and intake port 3 communicates with blowout port 4 through circulating air-course 7, and sintake port 3 communicates with evacuating duct 5 through ventilating air-course 8. Circulating fan 9 is placed in circulating air-course 7, and ventilating fan 10 is placed in ventilating air-course 8.

Circulating fan 9 communicates with intake port 3 at its drawing side, and also communicates with blowout port 4 at its blowout side, so that driving of fan 9 allows drawing the air in bathroom 2 through intake port 3 and blowing out the air into bathroom 2 from blowout port 4, namely, the drive of fan 9 implements a circulating air-blow operation.

Ventilating fan 10 communicates with intake port 3 at its drawing side, and communicates with evacuating duct 5 at its blowout side, so that driving of fan 10 allows drawing the air in bathroom 2 through intake port 3 and evacuates the air to the outside through evacuating duct 5, namely, the drive of fan 10 implements an evacuating operation.

The drive of ventilating fan 10 evacuates the air of bathroom 2 to the outside, so that bathroom 2 falls in a negative pressure, and the air in other rooms is drawn into bathroom 2 through a louver provided to a door of bathroom 2. As a result, bathroom 2 is ventilated.

In main unit 1 refrigerant circuit 12 is formed. Circuit 12 is filled with a refrigerant such as HCFC-based refrigerant of which molecule includes atoms of chlorine, hydrogen, fluorine, and carbon, or HFC-based refrigerant of which molecule includes atoms of hydrogen, carbon, and fluorine, or natural refrigerant such as hydrocarbon or carbon dioxide. Refrigerant circuit 12 includes compressor 13 for compressing the refrigerant, first heat exchanger 14 for exchanging heat between supplied air and the refrigerant, decompressing mechanism 15 formed of capillary tubes which decompresses and expands the refrigerant, and second heat exchanger 16 for exchanging heat between supplied air and the refrigerant.

Refrigerant circuit 12 also includes flow-path switching valve 17 which switches a heating cycle to/from a cooling cycle. The heating cycle indicates that the refrigerant compressed by compressor 13 flows through first heat exchanger 14, decompressing mechanism 15, second heat exchanger 16 in this order, and returns to compressor 13. The cooling cycle indicates that the refrigerant compressed by compressor 13 flows through second heat exchanger 16, decompressing mechanism 15, first heat exchanger 14 in this order, and returns to compressor 13.

First heat exchanger 14 is placed in circulating air-course 14, and second heat exchanger 16 is placed in ventilating air-course 8, so that first heat exchanger 14 exchanges the heat between the refrigerant and the air circulated by circulating fan 9 in bathroom 2. Second heat exchanger 16 exchanges the heat between the refrigerant and the air evacuated by ventilating fan 10 from bathroom 2 to the outside.

First and second heat exchangers 14, 16 are formed of, e.g. pipes and fins arranged lengthwise and crosswise and made of highly heat conductive material such as copper or aluminum.

Temperature sensor 18 is placed around intake port 3 for sensing a temperature of bathroom 2. Main unit 1 includes controller 19 that controls circulating fan 9, ventilating fan 10, compressor 13, and flow-path switching valve 17. Based on an instruction from a remote control (not shown) and a temperature sensed by sensor 18, controller 19 controls the rpm of fans 9 and 10, stops the operation of compressor 13, and switches flow-path switching valve 17. Controller 19 is formed of a control board wired to temperature sensor 18, circulating fan 9, ventilating fan 10, compressor 13, and flow-path switching valve 17.

FIG. 2 shows the bathroom air-conditioner in operation according to its operation pattern. The upper most line of FIG. 2 shows respective operating patterns of the air-conditioner, and operating statuses of circulating fan 9, ventilating fan 10, compressor 13, and flow-path switching valve 17 corresponding to each one of the operating patterns are described. The bathroom air-conditioner can implement three patterns, i.e. ventilating operation, heating operation, and cooling operation.

The ventilating operation is selected for drying the inside of bathroom 2 after bathing, and it drives ventilating fan 10 at an air volume necessary for a given ventilation amount, and holds circulating fan 9 and compressor 13 at a halt status. A given amount of air corresponding to a necessary amount of air for ventilation is drawn from bathroom 2 through intake port 3 to ventilating fan 10 via ventilating air-course 8, and then the air is evacuated to the outside through evacuating duct 5. Fresh air corresponding to this evacuated air is taken in through louver 11 for replacing the evacuated air, so that bathroom 2 can be ventilated.

The heating operation is selected for alleviating heat shock by heating the inside of bathroom 2 before a user takes a bath during a low-temperature season, e.g. winter, so that the user does not feel chilly and can take a bath comfortably. When the heating operation is implemented, circulating fan 9 is driven at an air volume set by the user, and compressor 13 is driven. Flow-path switching valve 17 is set at the heating cycle side, and the air volume of ventilating fan 10 is determined based on the temperature sensed by sensor 18.

The cooling operation is selected to lower the temperature for cooling bathroom 2 in a high temperature season, e.g. in summer, for a user to take a bath or clean bathroom 2 comfortably. When this cooling operation is implemented, circulating fan 9 is driven at an air volume set by the user, and compressor 13 is also driven. Flow-path switching valve is set at a cooling side, and the air volume of ventilating fan 10 is determined based on a temperature sensed by sensor 18.

Figure 3:
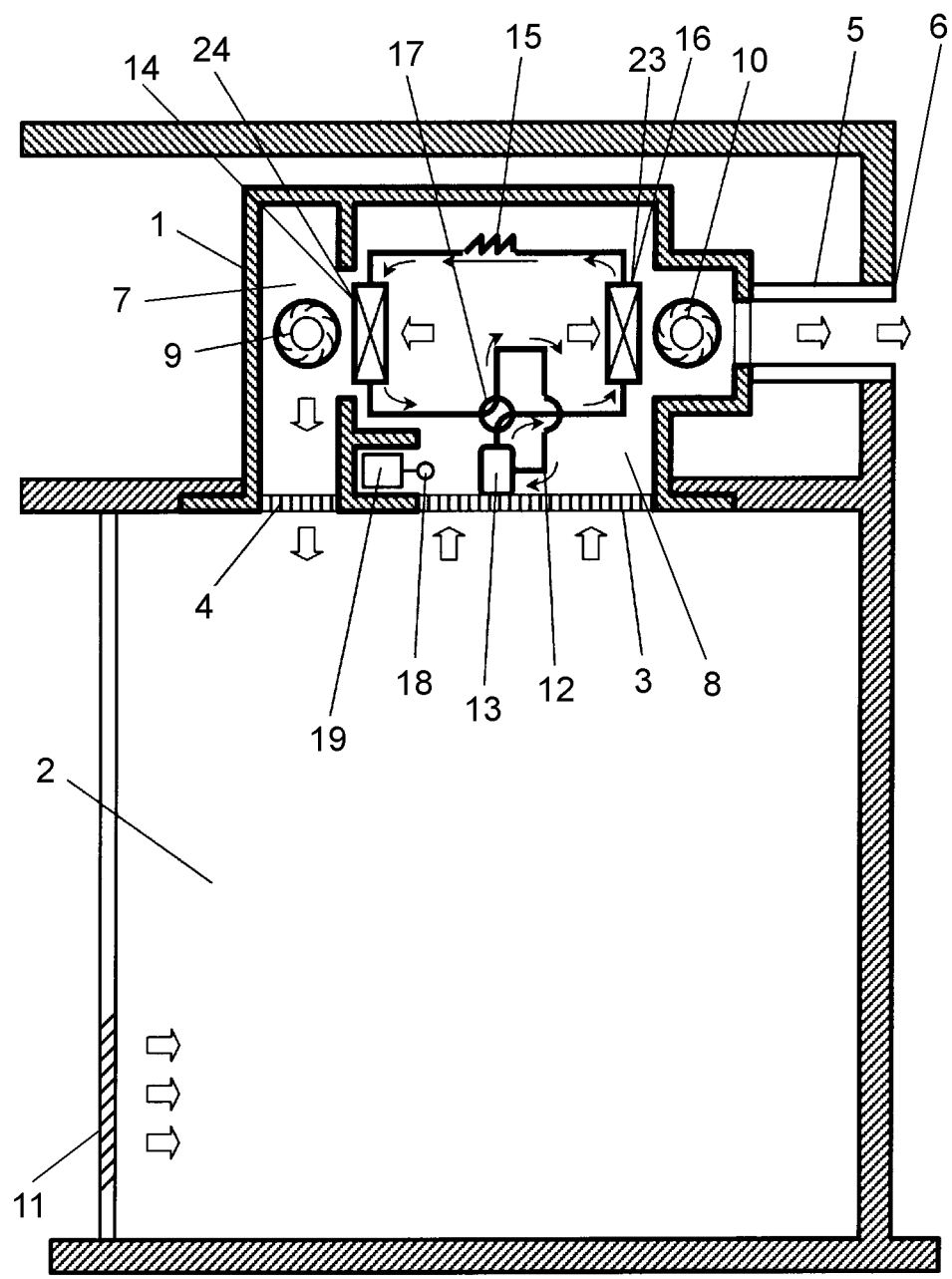
FIG. 3 shows a flow of air and a flow of refrigerant during a cooling operation of the bathroom air-conditioner.

FIG. 3 shows a flow of air and a flow of refrigerant during the cooling operation of the bathroom air-conditioner. When the cooling operation starts, flow-path switching valve 17 is set at the cooling cycle side. Controller 19 drives circulating fan 9 at an air volume set by the user, and ventilating fan 10 based on the temperature sensed by sensor 18, and it also drives compressor 13. The high-pressured refrigerant at a high temperature compressed by compressor 13 travels through flow-path switching valve 17 set at the cooling cycle side, and arrives at second heat exchanger 16, where the air of bathroom 2 is supplied through intake port 3 by ventilating fan 10, and the refrigerant radiates heat to this supplied air, of which temperature is thus raised, and the air is then evacuated to the outside via evacuating duct 5.

The refrigerant dissipates heat in second heat exchanger 16, and then travels through decompressing mechanism 15 formed of capillary tubes where the refrigerant decompresses and expands, and the refrigerant then travels to first heat exchanger 14, where circulating fan 9 operates at a set air volume, so that the air of bathroom 2 is supplied through intake port 3. The refrigerant absorbs heat from this air, and then travels through valve 17 and returns to compressor 13. The refrigerant thus circulates within refrigerant circuit 12.

A temperature of the air of bathroom 2 supplied to first heat exchanger 14 lowers due to the heat absorption by the refrigerant, and the air returns to bathroom 2 via blowout port 4. The air circulation discussed above is repeated, so that the temperature of bathroom 2 lowers. As a result, the cooling operation shown in FIG. 2 is thus implemented.

During the cooling operation, first heat exchanger 14 works as heat absorber 24 which has the refrigerant absorb the heat from the air of bathroom 2 blown by circulating fan 9, and second heat exchanger works as radiator 23 which has the refrigerant dissipate the heat to the air of bathroom 2 blown by ventilating fan 10.

Figure 4:
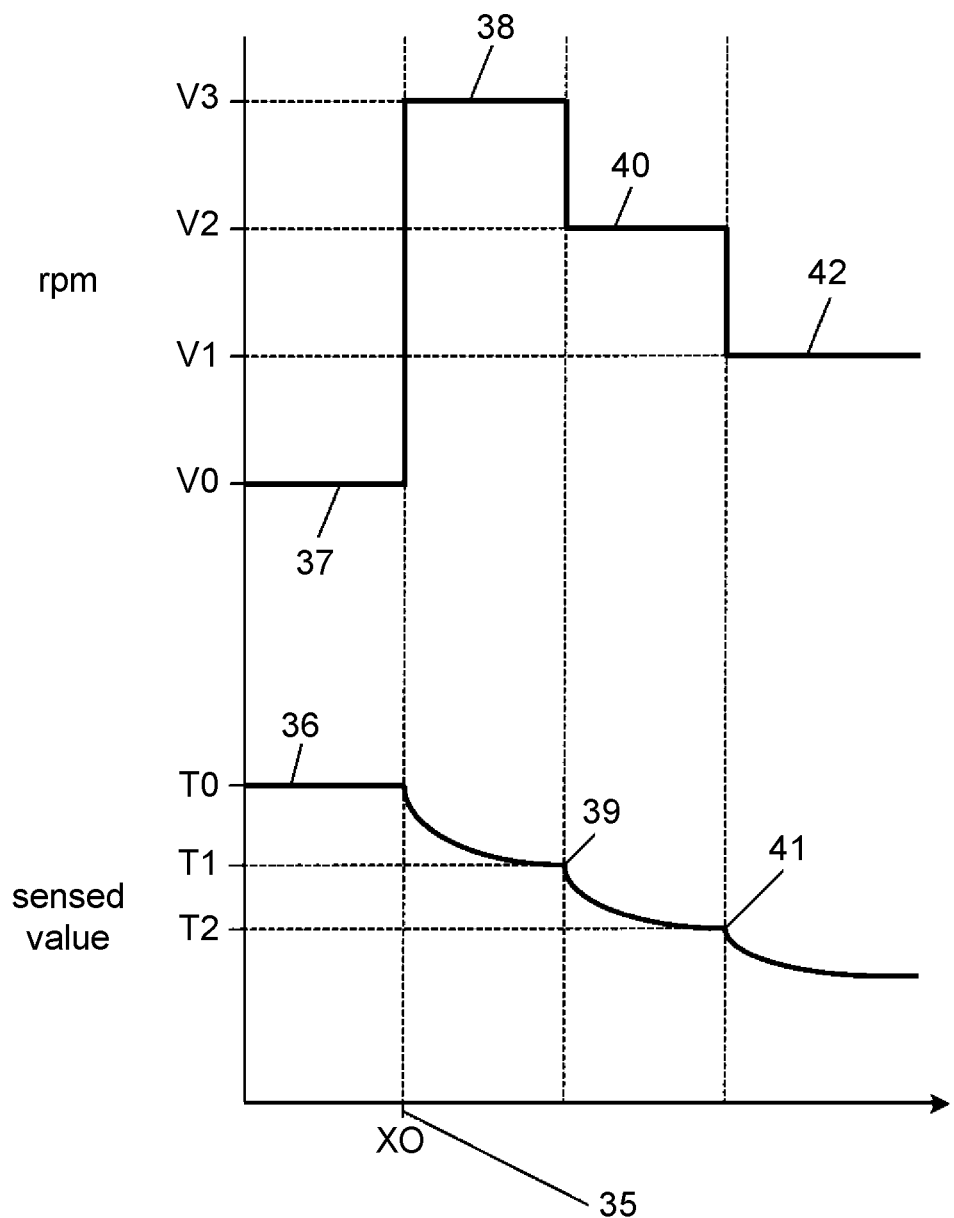
FIG. 4 shows a timing chart illustrating a relation between a temperature sensed by a temperature sensor and an rpm of a ventilating fan during the cooling operation.

FIG. 4 shows a timing chart illustrating a relation between a temperature sensed by the temperature sensor and an rpm of the ventilating fan during the cooling operation by the bathroom air-conditioner in accordance with this first embodiment. The horizontal axis of the timing chart shown in FIG. 4 represents a time, and the vertical axis represents a temperature sensed by temperature sensor 18 shown in FIG. 3 and the rpm of ventilating fan 10, i.e. an air volume of fan 10.

Temperature sensor 18 is placed around the intake port 3 of main unit 1. During the cooling operation, circulating fan 9 and ventilating fan 10 operate for drawing the air of bathroom 2 through intake port 3, and sensor 18 senses the temperature of the air in bathroom 2. This sensed temperature is dotted in the timing chart.

The cooling operation is demonstrated hereinafter with reference to FIGS. 3 and 4. Assume that the cooling operation starts at time X0 on graduation 35 of the horizontal axis of the timing chart shown in FIG. 4. The sensed temperature of bathroom 2 stands at T0, e.g. 35° C., as an initial value on graduation 36 of the vertical axis, and starts lowering gradually due to the cooling operation. Ventilating fan 10 halts before the cooling operation starts, so that the rpm of fan 10 is set at initial value V0, i.e. rpm=0 (zero), on graduation 37. When the cooling operation starts, controller 19 issues an order to fan 10, which then starts operating at set rpm V3 shown on graduation 38.

The foregoing mechanism allows supplying the air of bathroom 2 to radiator 23, and the refrigerant dissipates the heat. To be more specific, a temperature of the air heated by the refrigerant which dissipates the heat in radiator 23 rises to a temperature, e.g. 45° C., higher than 35° C. in bathroom 2, and the air is evacuated to the outside. The refrigerant absorbs the heat in heat absorber 24 from the air of bathroom 2 circulated by circulating fan 9, and the amount of this heat to be absorbed is the amount of dissipated heat which corresponds to the difference in temperature. The cooling operation is thus implemented.

Since the air in bathroom 2 is evacuated by ventilating fan 10 to the outside, the air in rooms adjacent to bathroom 2, e.g. a dressing room, is drawn through louver 11 into bathroom 2. A temperature of the air drawn through louver 11 is approximately the same as initial temperature T0 in bathroom 2, i.e. 35° C.

Continuous operation of the cooling operation discussed above will lower the temperature of bathroom 2 at a smaller decrement with time because of the following reason: The temperature of the air in bathroom 2 supplied to radiator 23 by ventilating fan 10 lowers gradually due to the cooling operation, so that the temperature of the air having undergone radiator 23 and evacuated to the outside also lowers gradually.

For instance, assume that the temperature of bathroom 2 stands at 35° C. when the cooling operation starts, and a temperature of the air heated by radiator 23 stands at 50° C., then the temperature in bathroom 2 lowers to 30° C. because the cooling operation is done for a while, and the temperature of the air heated by radiator 23 lowers from 50° C. to 47° C. In this case, a difference in temperature between the air drawn from the adjacent room (35° C.) through louver 11 and the air heated by radiator 23 and evacuated to the outside is 15° C., but this difference decreases to 12° C. because the cooling operation lowers the temperature of bathroom 2 to 30° C. Bathroom 2 as a whole reduces a heat amount corresponding to the decrement in temperature, i.e. from 15° C. to 12° C., so that the decrement in temperature of bathroom 2 becomes smaller with time.

Controller 19 changes the rpm of ventilating fan 10 from present value V3 shown in FIG. 4 to V2 marked at graduate 40 and lower than V3 when temperature T1 lowers to, e.g. 30° C. (temperature sensed by sensor 18) marked at graduate 39. This change will reduce the air volume of ventilating fan 10, so that enthalpy exchange efficiency of radiator 23 improves and the temperature of the air having undergone radiator 23 rises. The difference in temperature between the air having undergone radiator 23 and the air drawn from the adjacent room through louver 11 thus becomes greater, so that a heat dissipation loss due to the ventilation can be reduced. On top of that, a reduction in air volume of ventilating fan 10 will reduce a heat amount entering bathroom 2 through louver 11, so that bathroom 2 can be cooled more efficiently although an amount of heat absorbed by heat absorber 24 decreases.

Assume that the cooling operation keeps continuing, and that the temperature sensed by sensor 18 lowers to given value T2 shown at graduation 41, e.g. 25° C., then controller 19 lowers the rpm of ventilating fan 10 from V2 to V1 shown at graduation 42. This change in rpm further reduces the air volume of fan 10, so that the enthalpy exchange efficiency in radiator 23 improves and the temperature of the air having undergone radiator 23 rises. The difference in temperature between this air and the air drawn through louver 11 can be thus maintained, so that the heat dissipation loss due to the ventilation can be reduced. The reduction in air volume of ventilating fan 10 will further reduce the heat amount entering bathroom 2 through louver 11, so that bathroom 2 can be cooled more efficiently and the temperature thereof lowers although the amount of heat absorbed by heat absorber 24 decreases.

As discussed above, when the temperature of bathroom 2 falls lower than a given value during the cooling operation, an amount of air-blow from ventilating fan 10 is controlled to decrease step by step. As a result, the air volume supplied to radiator 23 with a cooling environment of bathroom 2 is maintained, so that the enthalpy efficiency in radiator 23 can improve as well as the heat dissipation loss to the air to be evacuated from bathroom 2 to the outside can decrease. As a result, energy efficiency is improved. On top of that, the air volume drawn through louver 11 into bathroom 2 decreases, so that the cooling load can be reduced and the cooling operation can be implemented more efficiently.

The foregoing embodiment is only an instance of the present invention, which is thus not limited to this embodiment. For instance, this embodiment discloses that controller 19 changes the rpm of ventilating fan 10 in three steps based on a temperature sensed by sensor 18; however, an adjustment of the air volume of fan 10 is not limited to this method. The air volume can be changed in two steps or four steps, or greater than four steps. Ventilating fan 10 can employ a DC motor as its driving source so that the air volume can be changed linearly.

In this first embodiment the capillary tube is used as decompressing mechanism 15; however, decompressing mechanism 15 can at least decompress and expand the refrigerant, so that an electronic expansion valve can replace the capillary tube.

Figure 5:
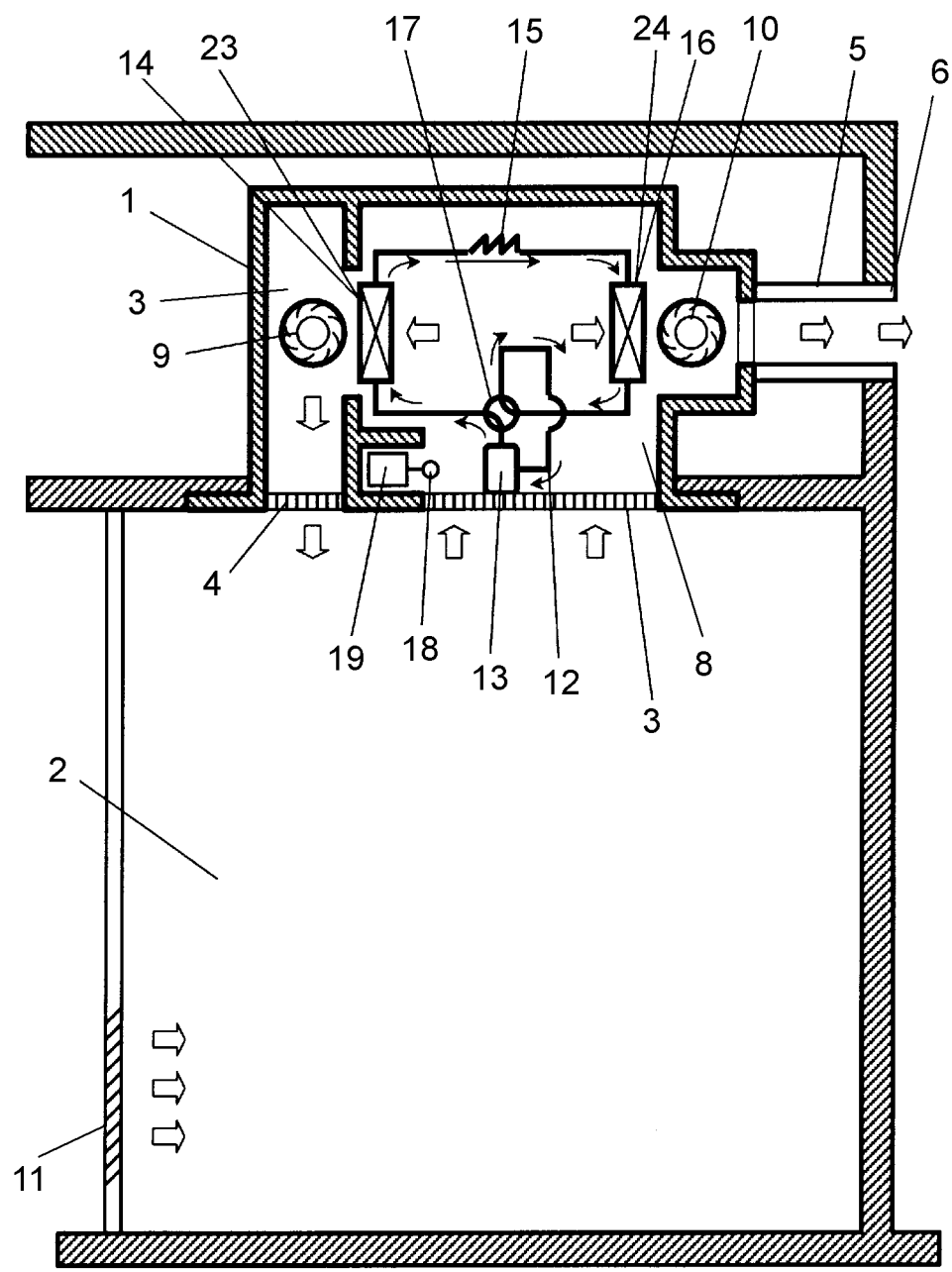
FIG. 5 shows a flow of air and a flow of refrigerant during a heating operation of the bathroom air-conditioner.

FIG. 5 shows a flow of air and a flow of refrigerant during the heating operation of the bathroom air-conditioner in accordance with the first embodiment. When the heating operation starts, flow-path switching valve 17 is set to the heating cycle side. Controller 19 drives circulating fan 9 at an air volume set by the user, and ventilating fan 10 based on the temperature sensed by sensor 18, and it also drives compressor 13. The high-pressured refrigerant at a high temperature compressed by compressor 13 travels through flow-path switching valve 17 set at the heating cycle side, and arrives at first heat exchanger 14, where the air of bathroom 2 drawn through intake port 3 into main unit 1 is supplied by circulating fan 9 which operates at a given air volume. The heat is exchanged between the air of bathroom 2 supplied to first heat exchanger 14 and the refrigerant, and the refrigerant radiates heat to this supplied air, of which temperature is thus raised, and the air is then evacuated from blowout port 4 into bathroom 2.

The refrigerant dissipates heat in first heat exchanger 14, and then travels through decompressing mechanism 15 formed of capillary tubes where the refrigerant decompresses and expands, and the refrigerant then travels to second heat exchanger 16, where ventilating fan 10 supplies the air of bathroom 2 through intake port 3. The refrigerant absorbs heat from this supplied air, and then travels through valve 17 and returns to compressor 13. The refrigerant thus circulates within refrigerant circuit 12.

The air of bathroom 2 undergoes second heat exchanger 16, where the refrigerant absorbs the heat from the air of which enthalpy is thus lowered, and then the air is evacuated to the outside. The operation discussed above raises the temperature of bathroom 2. As a result, the heating operation shown in FIG. 2 is thus implemented.

During the heating operation, first heat exchanger 14 works as radiator 23 which has the refrigerant dissipate heat to the supplied air, i.e. the air of bathroom 2 blown by circulating fan 9, and second heat exchanger 16 works as heat absorber 24 which absorbs heat from the supplied air, i.e. the air of bathroom 2 blown by ventilating fan 10. Radiator 23 is a condenser and heat absorber 24 is an evaporator in a refrigerating cycle.

Figure 6:
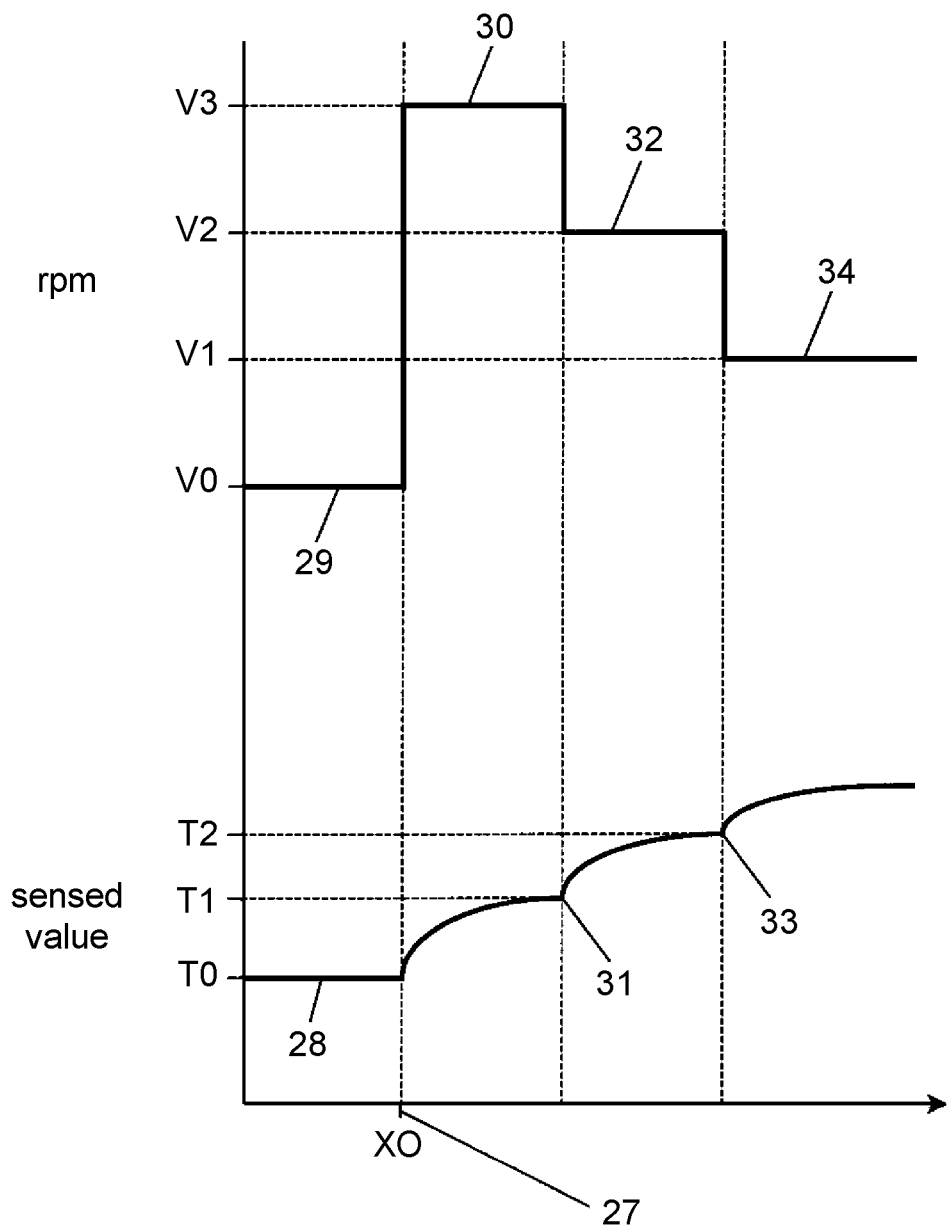
FIG. 6 shows a timing chart illustrating a relation between a temperature sensed by a temperature sensor and an rpm of a ventilating fan during the heating operation.

FIG. 6 shows a timing chart illustrating a relation between a temperature sensed by the temperature sensor and an rpm of the ventilating fan during the heating operation of the bathroom air-conditioner in accordance with this first embodiment. The horizontal axis of the time chart shown in FIG. 6 represents time, and the vertical axis represents a temperature sensed by temperature sensor 18 shown in FIG. 3 and the rpm of ventilating fan 10, i.e. an air volume of fan 10.

The heating operation is demonstrated hereinafter with reference to FIGS. 5 and 6. Assume that the heating operation starts at time X0 on graduation 27 of the horizontal axis of the timing chart shown in FIG. 6. The sensed temperature of bathroom 2 stands at T0, e.g. 20° C., as an initial value on graduation 28 of the vertical axis, and starts rising gradually due to the heating operation. Ventilating fan 10 halts before the heating operation starts, so that the rpm of fan 10 is set at initial value V0, i.e. rpm=0 (zero), on graduation 29. When the heating operation starts, controller 19 issues an order to fan 10, which then starts operating at set rpm V3 shown on graduation 30.

The foregoing mechanism allows supplying the air of bathroom 2 to heat absorber 24, and the refrigerant absorbs the heat. To be more specific, a temperature of the air of which heat is absorbed by heat absorber 24 lowers to a temperature, e.g. 5° C., lower than 20° C. in bathroom 2, and the air is evacuated to the outside. The refrigerant dissipates the heat in radiator 23 to the air of bathroom 2 circulated by circulating fan 9, and the amount of this heat to be dissipated is the amount of absorbed heat which corresponds to the difference in temperature. The heating operation is thus implemented.

Since the air in bathroom 2 is evacuated by ventilating fan 10 to the outside, the air in rooms adjacent to bathroom 2, e.g. a dressing room, is drawn through louver 11 into bathroom 2. A temperature of the air drawn through louver 11 is approximately the same as initial temperature T0 in bathroom 2, i.e. 20° C.

Continuous operation of the heating operation discussed above will raise the temperature of bathroom 2 at a smaller increment with time because of the following reason: The temperature of the air in bathroom 2 supplied to heat absorber 24 by ventilating fan 10 rises gradually due to the heating operation, so that the temperature of the air having undergone heat absorber 24 and being evacuated to the outside also rises gradually.

For instance, assume that the temperature of bathroom 2 stands at 20° C. when the heating operation starts, and a temperature of the air of which heat is absorbed by heat absorber 24 stands at 5° C., then the temperature in bathroom 2 rises to 25° C. because the heating operation is done for a while, and the temperature of the air of which heat is absorbed by heat absorber 24 rises from 5° C. to 8° C. In this case, a difference in temperature between the air drawn from the adjacent room (20° C.) through louver 11 and the air of which heat is absorbed by heat absorber 24 and evacuated to the outside is 15° C., but this difference decreases to 12° C. because the heating operation raises the temperature of bathroom 2 to 25° C. Bathroom 2 as a whole reduces a heat amount corresponding to the decrement in temperature, i.e. from 15° C. to 12° C., so that the increment in temperature of bathroom 2 becomes smaller with time.

Controller 19 changes the rpm of ventilating fan 10 from present value V3 shown in FIG. 6 to a given value V2 marked at graduate 32 and lower than V3 when temperature T1 rises to, e.g. 30° C., (sensed by sensor 18) marked at graduate 31. This change will reduce the air volume of ventilating fan 10, so that enthalpy exchange efficiency of heat absorber 24 improves and the temperature of the air having undergone heat absorber 24 lowers. The difference in temperature between the air having undergone heat absorber 24 and the air drawn from the adjacent room through louver 11 thus becomes greater, so that a heat dissipation loss due to the ventilation can be reduced. On top of that, a reduction in air volume of ventilating fan 10 will reduce a heat amount entering bathroom 2 through louver 11, so that bathroom 2 can be heated more efficiently although an amount of heat dissipated by radiator 23 decreases.

Assume that the heating operation keeps continuing, and that the temperature sensed by sensor 18 rises to given value T2 marked at graduation 33, e.g. 35° C., then controller 19 lowers the rpm of ventilating fan 10 from V2 to V1 marked at graduation 34. This change in rpm further reduces the air volume of fan 10, so that the enthalpy exchange efficiency in heat absorber 24 further improves and the temperature of the air having undergone heat absorber 24 lowers. The difference in temperature between this air and the air drawn through louver 11 can be thus maintained, so that a heat collection loss due to the ventilation can be reduced. The reduction in air volume of ventilating fan 10 will further reduce the heat amount entering bathroom 2 through louver 11, so that bathroom 2 can be heated more efficiently and the temperature of bathroom 2 rises although the amount of heat dissipated by radiator 23 decreases.

As discussed above, when the temperature of bathroom 2 rises higher than a give value during the heating operation, an amount of air-blow from ventilating fan 10 is controlled to decrease step by step. As a result, the air volume supplied to radiator 23 with a heating environment of bathroom 2 is maintained, so that the enthalpy efficiency in heat absorber 24 can improve as well as the heat collection loss from the air to be evacuated from bathroom 2 to the outside can decrease. As a result, energy efficiency is improved. On top of that, the air volume drawn through louver 11 into bathroom 2 decreases, so that the heating load can be reduced and the heating operation can be implemented more efficiently.

As the temperature of bathroom 2 rises due to the heating operation, the air volume drawn through louver 11 decreases, thereby reducing the feeling of drawing a draft when a user takes a bath, and increasing the amenity of bathroom 2.

Embodiment 2

Figure 7:
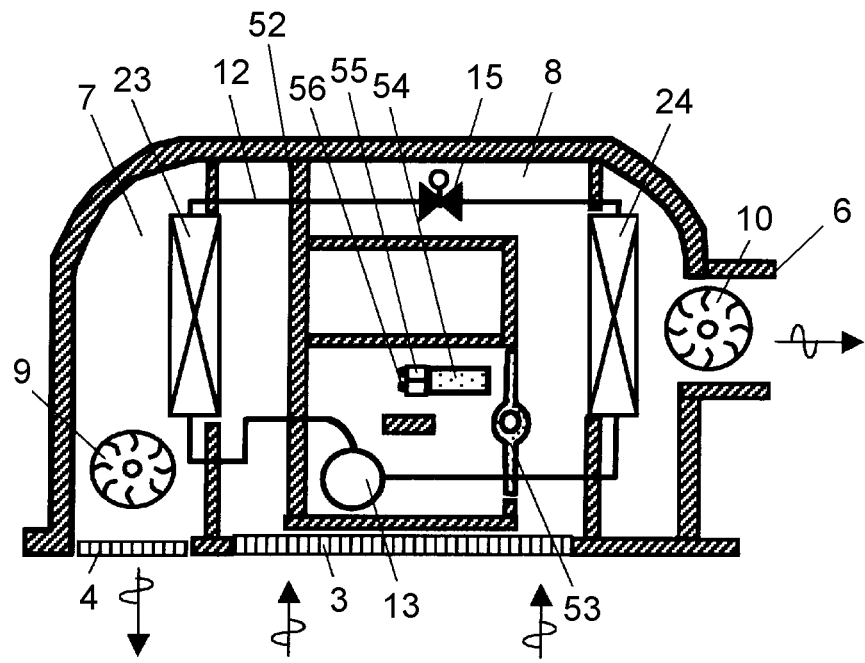
FIG. 7 shows schematically a sectional view of a bathroom air-conditioner in accordance with a second embodiment of the present invention.

A method of increasing an efficiency of energy is demonstrated hereinafter. This method increases an amount of heat to be collected during the heating operation. FIG. 7 shows schematically a sectional view of a bathroom air-conditioner in accordance with the second embodiment of the present invention.

The bathroom air-conditioner shown in FIG. 7 differs from that shown in FIG. 5 in the following points: Partition 52 is newly provided for separating circulating air-course 7 from ventilating air-course 8; Compressor 13, decompressing mechanism 15, and controller 54 are placed in ventilating air-course 8; Ventilating fan 10, heat absorber 24 are placed in this order from outer blowout port 6; and no flow-path switching valve is provided because the bathroom air-conditioner shown in FIG. 7 only implements the heating operation.

The bathroom air-conditioner shown in FIG. 7 comprises the following elements: shutter plate 53 for switching an air-course in ventilating air-course 7; and controller 54 for controlling compressor 13, circulating fan 9, ventilating fan 10, and shutter plate 53. Shutter plate 53 controls a volume of air traveling from the bathroom to compressor 13 and controller 54.

The bathroom air-conditioner shown in FIG. 7 includes load-temperature sensor 55 as an over-loaded sensor which senses an over-loaded status of at least one of compressor 13 and controller 54. It also includes a humidity sensor 56 which senses humidity around at least one of compressor 13 and controller 54.

FIG. 7 illustrates load-temperature sensor 55 and humidity sensor 56 to be used only for sensing a temperature of controller 54 and sensing a humidity around controller 54; however, they can be used for sensing the temperature of compressor 13 and sensing the humidity around compressor 13, or for sensing the temperatures of both of them and sensing the respective humidity around both of them.

Controller 54 can control at least compressor 13, circulating fan 9, ventilating fan 10, and shutter plate 53, so that it is formed of a circuit employing a relay, a printed circuit board, or a control board.

Humidity sensor 56 can at least sense humidity, so that it employs a polymer membrane humidity sensor which senses a relative humidity of an atmosphere by using a change in dielectric constant due to an adsorption or an emission of moisture to/from polymer membrane. It can also employ a ceramic humidity sensor, of which dry-wet member is formed of sintered ceramic, using a porous ceramic which tends to adsorb water vapor. An electrolytic humidity sensor using lithium chloride can be also employed as humidity sensor 56.

Figure 8:
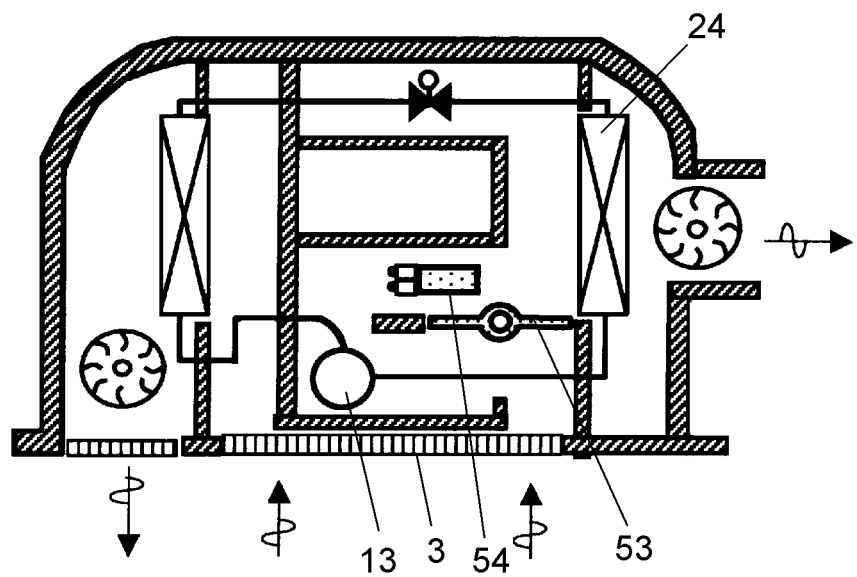
FIG. 8 shows schematically a sectional view of the bathroom air-conditioner with a shutter plate fully opened.

An operation of the bathroom air-conditioner in accordance with the second embodiment is demonstrated hereinafter. FIG. 8 shows schematically a sectional view of the bathroom air-conditioner with a shutter plate fully opened while FIG. 7 shows the bathroom air-conditioner with the shutter plate fully closed.

As shown in FIG. 7, when shutter plate 53 is fully closed, the air drawn through intake port 3 travels through heat absorber 24 and is evacuated to the outside, and the air never travels through compressor 13 or controller 54.

As shown in FIG. 8, when shutter plate 53 is fully opened, the air drawn through intake port 3 is warmed while it travels through compressor 13 and controller 54. An amount of heat absorbed by heat absorber 24 increases because the heat of the air drawn through intake port 3 is added with another heat generated in the air-conditioner, i.e. this another heat includes the heat generated in compressor 13 and controller 54, so that the heat efficiency improves and energy saving can be expected. On top of that, the air drawn through intake port 3 cools compressor 13, of which temperature can be thus kept low, thereby giving compressor 13 greater durability. Controller 54 can be also cooled simultaneously, so that it can be downsized and its cost can be reduced.

The air warmed by compressor 13 and controller 54 is blown to heat absorber 24, so that frosting to heat absorber 24 during a low temperature period can be prevented without using a heater.

An opening angle of shutter plate 53 can change an amount of air-blow to the air-course which communicates with compressor 13 and controller 54, so that the opening angle toward closing direction will prevent compressor 13 from being overloaded when the temperature of the bathroom rises over as high as 30° C. and heat supplement from compressor 13 and controller 54 is not needed.

Figure 9A:
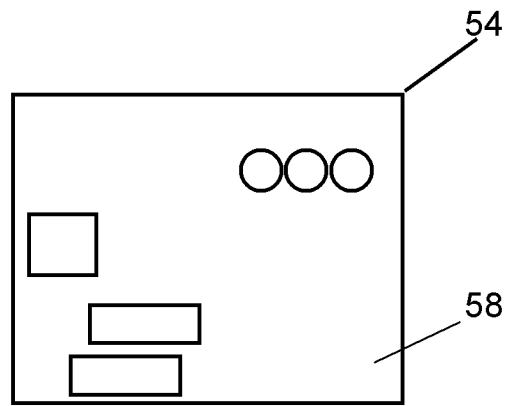
FIG. 9A shows a structure of a controller for the bathroom air-conditioner. The controller employs a printed circuit board.
Figure 9B:
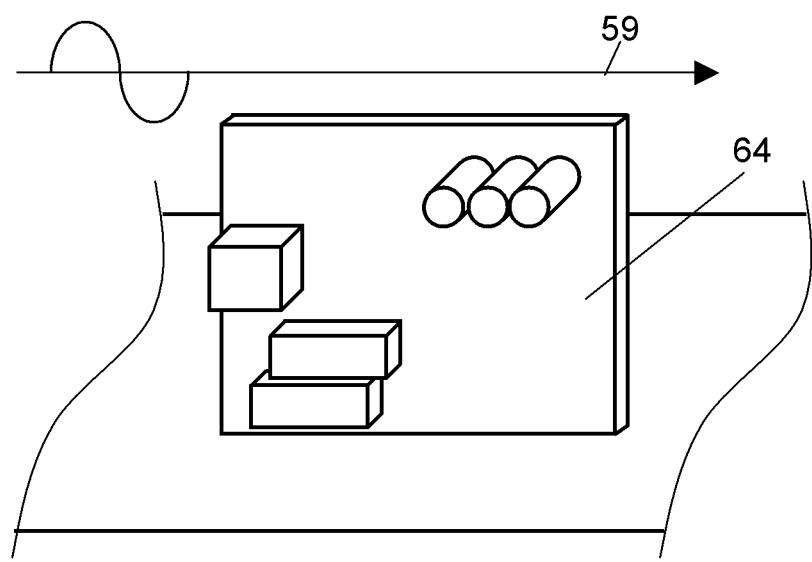
FIG. 9B shows the controller with its face having a smallest projection area placed vertically with respect to an air-blowing direction.

FIG. 9A shows a structure of a controller for the bathroom air-conditioner in accordance with the second embodiment. The controller employs a printed circuit board. FIG. 9B shows the controller with its face having a smallest projection area placed vertically with respect to an air-blowing direction.

Controller 54 employs printed circuit board 58 shown in FIG. 9A, and is placed with its face of the smallest projection area vertically confronting air-blowing direction 59 through ventilating air-course 8. This structure allows reducing airflow resistance, so that a load current of ventilating fan 10 can be reduced for saving energy and noises occurring when the air-blow hits controller 54 and the air-blow can be lowered.

In the foregoing description, controller 54 employs a printed circuit board (PCB) as an instance; however, controlling components can be discretely connected with one another instead of using the PCB. In this case, the respective controlling components are placed with their faces of the smallest projection area vertically confronting air-blowing direction 59, so that an advantage similar to what is discussed above can be obtained.

If humidity sensor 56 senses a relative humidity, e.g. over 85% (out of a given range), controller 54 controls the shutter plate 53 to turn toward the closing direction, so that the amount of air-blow to controller 54 and compressor 13 can be varied or the air-blow can be stopped. As a result, controller 54 and compressor 13 can be prevented from being placed in a highly humid environment, and a dew formation or rust can be prevented.

Load-temperature sensor 55 is provided as an over-load sensor for sensing an over-loaded status of at least one of compressor 13 and controller 54, so that an amount of air-blow to at least one of compressor 13 and controller 54 can be changed, and thus one of compressor 13 and controller 54 can be cooled. Compressor 13 and controller 54 can be thus downsized and the cost thereof can be reduced. On top of that, they are free from being used in an over-load condition, so that stable performance thereof can be expected.

Figure 10A:
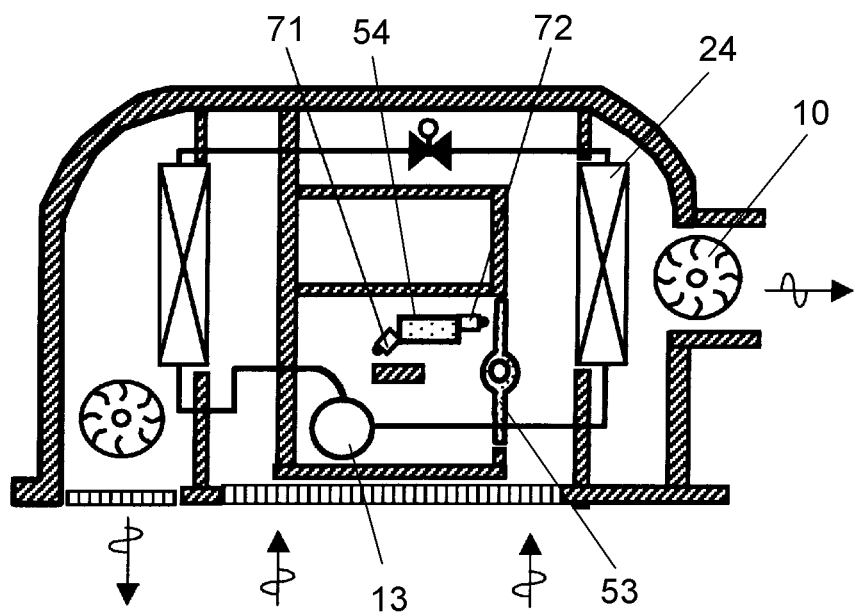
FIG. 10A shows schematically a sectional view of another bathroom air-conditioner in accordance with the second embodiment with a shutter plate fully closed.
Figure 10B:
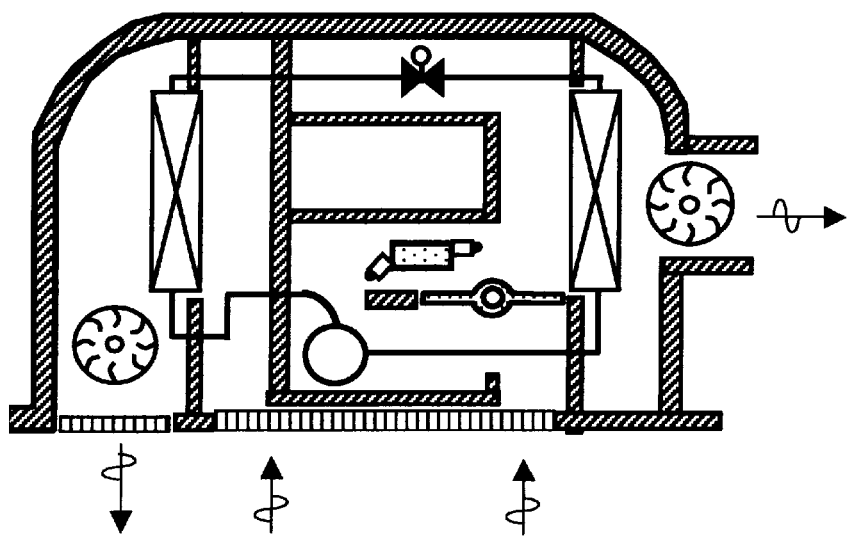
FIG. 10B shows schematically a sectional view of the bathroom air-conditioner with a shutter plate fully opened.

FIG. 10A shows schematically a sectional view of another bathroom air-conditioner in accordance with the second embodiment with a shutter plate fully closed. FIG. 10B shows schematically a sectional view of the bathroom air-conditioner with the shutter plate fully opened.

The bathroom air-conditioner shown in FIGS. 10A and 10B employs non-contact temperature sensor 71 as a load-temperature sensor for sensing a temperature at a charging section of compressor 13. Temperature sensor 72 is also provided for sensing a temperature around at least one of compressor 13 and controller 54. Temperature sensor 72 can at least sense a temperature, so that a positive thermistor or a negative thermistor can serve for this work. Non-contact temperature sensor 71 can sense at least a temperature without touching a subject item, so that infrared rays can be used.

When non-contact temperature sensor 71 of the bathroom air-conditioner shown in FIGS. 10A and 10B senses, e.g. over 80° C. (out of a given range), controller 54 raises the rpm of ventilating fan 10 for increasing an air-blow amount to compressor 13, which can be thus cooled, so that a temperature of the charging section can be sensed in a non-contact manner with ease.

When temperature sensor 72 senses a temperature, e.g. over 30° C. (out of a given range), controller 54 changes the opening angle of shutter plate 53 toward the closing direction, so that the air-blow amount to controller 54 and compressor 13 can be varied or the air-blow thereto can be stopped. As a result, an amount of heat supplement to heat absorber 24 can be varied, and a load status of refrigerating cycle can be adjusted.

Figure 11:
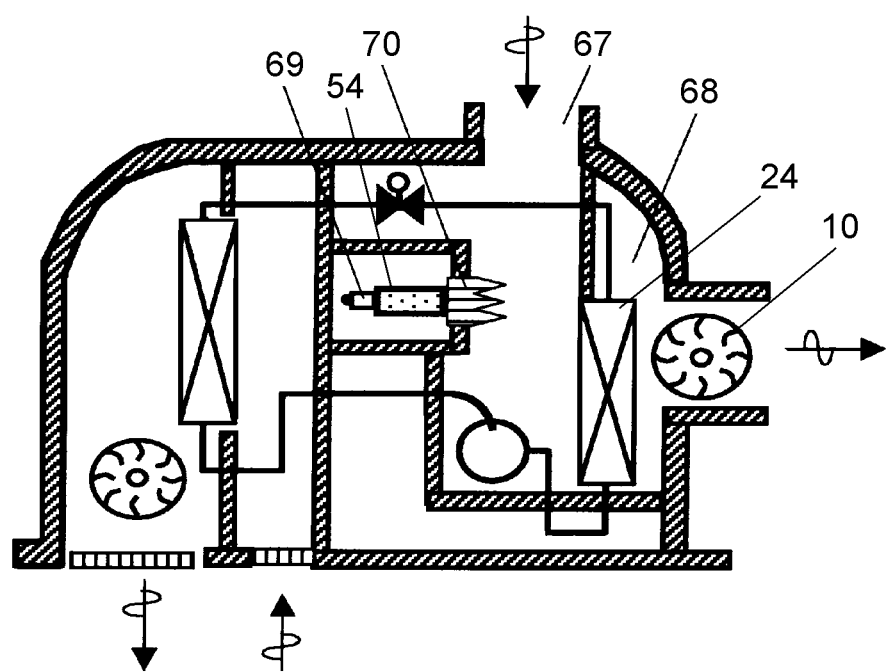
FIG. 11 shows schematically a sectional view of a still another bathroom air-conditioner in accordance with the second embodiment.

FIG. 11 shows schematically a sectional view of still another bathroom air-conditioner in accordance with the second embodiment. This air-conditioner draws the air in a room other than the bathroom, e.g. powder room, dressing room, or living room, through interior intake port 67, which is open to one of these rooms, into ventilating air-course 68.

Controller 54 includes radiating plate 70 placed in ventilating air-course 68, in which controller 54 is not placed but only radiating plate 70 is placed. Current detector 69 is provided as an over-load status sensor for detecting an electric current supplied to controller 54. Current detector 69 can at least detect an electric current, so that a component that can sense a voltage across a resistor or a component using a current transformer can serve for this work.

When the bathroom air-conditioner shown in FIG. 11 is in operation, the air drawn from the other room discussed above is delivered to ventilating air-course 68 due to the operation of ventilating fan 10, and the air is warmed therein. A heat amount absorbed by heat absorber 24 thus increases because the heat of the air drawn through intake port 67 is added with the heat generated in the air-conditioner including the heat generated from radiating plate 70. As a result, thermal efficiency is improved and energy saving can be expected.

The foregoing structure allows an efficient cooling through radiating plate 70, and controller 54 is not placed in ventilating air-course 68, so that there is no need worrying about dust accumulation on controller 54.

Figure 12A:
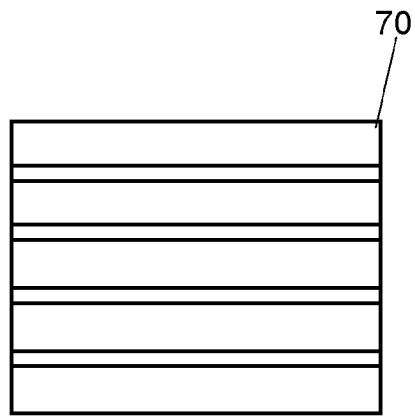
FIG. 12A shows a radiating plate of a controller of the bathroom air-conditioner.
Figure 12B:
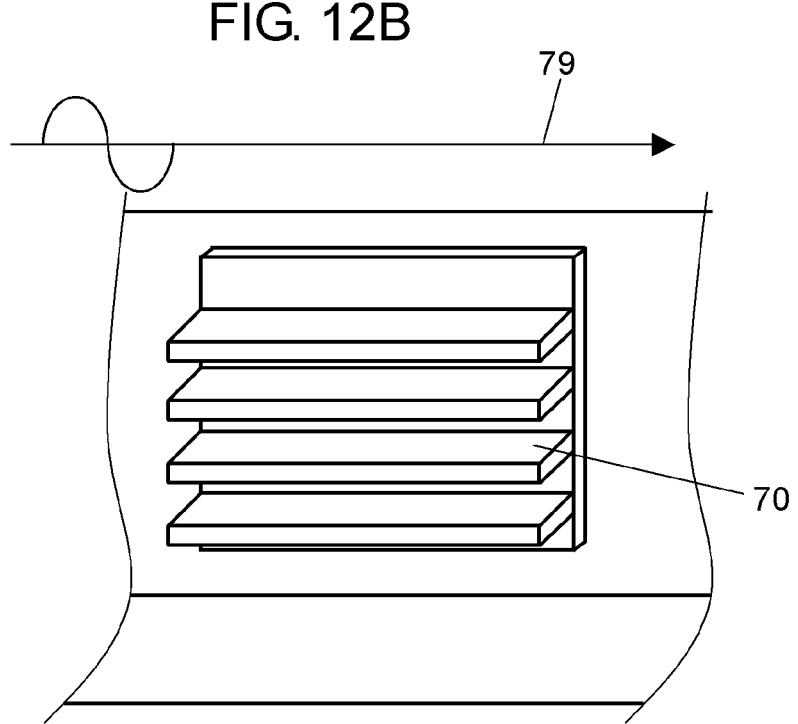
FIG. 12B shows the radiating plate of the controller with its face having a smallest projection area placed vertically with respect to an air-blowing direction.

FIG. 12A shows a radiating plate of a controller of further another bathroom air-conditioner in accordance with the second embodiment. FIG. 12B shows the radiating plate of the controller with its face having a smallest projection area placed vertically with respect to an air-blowing direction.

Radiating plate 70 employs a fin type as shown in FIG. 12A, and is placed with a face having the smallest projection area vertically confronting air-blowing direction 79 flowing in ventilating air-course 68 as shown in FIG. 12B. This structure allows reducing a draft resistor and a load current of ventilating fan 10 for saving energy, it also allows lowering noises occurring when the air-blow hits radiating plate 70.

When current detector 69 detects, e.g. a current over a rated one (out of a given range), controller 54 raises the rpm of ventilating fan 10, so that an air-blow amount to radiating plate 70 can be varied for cooling plate 70. Controller 54 can be thus downsized and its cost can be reduced. On top of that, a temperature of controller 54 can be kept constant, so that a tolerance of temperature characteristics of the electronic components used in controller 54 can be reduced, and the performance of controller 54 can be thus stable.

INDUSTRIAL APPLICABILITY

The bathroom air-conditioner of the present invention allows reducing a loss in heat collection during a continuous operation of the air-conditioner, which thus can operate more efficiently. This air-conditioner can be used not only in a bathroom but also in a living room, bedroom, kitchen, or washroom.

The invention claimed is:

1. A bathroom air-conditioner comprising:
    a refrigerant circuit which connects a compressor for compressing refrigerant, a radiator for making the refrigerant dissipate heat to supplied air, a decompressing mechanism for making the refrigerant expand to decompress, and a heat absorber for absorbing heat from the supplied air, through a pipe;
    a circulating air-course running from an intake port open to a bathroom for drawing air in the bathroom to a blowout port open to the bathroom for blowing out the air to the bathroom at a different place from the intake port; and
    a ventilating air-course running from an interior intake port open to a room other than the bathroom to an outer blowout port which blows out the air from the room to an outside, the ventilating air-course isolated from the circulating air-course,
    wherein the radiator and a circulating fan, which circulates the air of the bathroom, are placed in the circulating air-course, and the heat absorber and a ventilating fan, which discharge the air of the room to the outside of the bathroom, are placed in the ventilating air-course,
    wherein the heat absorber makes the refrigerant absorb heat from the air discharged from the room to the outside while the radiator makes the refrigerant dissipate heat to the air blown in the bathroom for heating the bathroom,
    wherein during the heating of the bathroom, when a temperature of the bathroom becomes higher than a predetermined temperature, an air-blow amount supplied by the ventilating fan can be reduced by a controller.

2. The bathroom air-conditioner of claim 1, further comprising:
    a partition for isolating the circulating air-course from the ventilating air-course,
    wherein the compressor, the decompressing mechanism, and the controller are disposed in a side of the partition providing the ventilating air-course, and the ventilating fan and the heat absorber are disposed in this order from the outer blowout port.

3. The bathroom air-conditioner of claim 1, wherein a radiating plate is attached to the controller, the radiating plate radiates heat from the controller, and the radiating plate is disposed in the ventilating air-course such that a face having a smallest projection area among other faces of the radiating plate vertically confronts an air-blowing direction of the ventilating air-course.

4. The bathroom air-conditioner of claim 1, wherein a shutter plate is disposed in the ventilating air-course for controlling an air volume of the bathroom flowing to the compressor and the controller.

5. The bathroom air-conditioner of claim 1, further comprising:
    an overload sensor which senses an over loaded status of at least one of the compressor and the controller.

6. The bathroom air-conditioner of claim 4 further comprising:
    a temperature sensor which senses a temperature in a vicinity of at least one of the compressor and the controller.

7. The bathroom air-conditioner of claim 4 further comprising:
    a humidity sensor which senses a humidity in a vicinity of at least one of the compressor and the controller.

8. The bathroom air-conditioner of claim 5, wherein the overload sensor is a load-temperature sensor which senses a temperature of at least one of the compressor and the controller.

9. The bathroom air-conditioner of claim 5, wherein the overload sensor is a current detector which detects an electric current of at least one of the compressor and the controller.

10. The bathroom air-conditioner of claim 8, wherein the load-temperature sensor is a non-contact temperature sensor which senses a temperature of at least one of the compressor and the controller in a non-contact manner.

11. A bathroom air-conditioner comprising:
    a refrigerant circuit which connects through a pipe a compressor for compressing refrigerant, a radiator for making the refrigerant dissipate heat to supplied air, a decompressing mechanism for making the refrigerant expand to decompress, and a heat absorber for absorbing heat from the supplied air;
    a circulating air-course running from an intake port open to a bathroom for drawing air in the bathroom to a blowout port open to the bathroom at a different place from the intake port for blowing out the air to the bathroom; and
    a ventilating air-course running from an interior intake port open to a room other than the bathroom to an outer blowout port which blows out the air from the room to an outside, the ventilating air-course isolated from the circulating air-course,
    wherein the heat absorber and a circulating fan, which circulates the air of the bathroom, are placed in the circulating air-course, and the radiator and a ventilating fan, which discharges the air from the room to the outside, are placed in the ventilating air-course,
    wherein the heat absorber makes the refrigerant absorb heat from the air in the bathroom while the radiator makes the refrigerant dissipate heat to the air to be discharged from the room to the outside for cooling the bathroom, wherein a controller is configured to, during the cooling of the bathroom, when a temperature of the bathroom becomes lower than a predetermined temperature, reduce an air-blow amount supplied from the ventilating fan.

12. A bathroom air-conditioner comprising:

a ventilating fan arranged to draw air through a first intake port and ventilate the air through an evacuating port to provide a ventilation course;

a circulating fan arranged to draw air from a second intake port and ventilate the air to a bathroom through a blow-out port to provide a circulating air course, the ventilation course isolated from the circulating air course;

a first heat exchanger disposed in the ventilation course;

a second heat exchanger coupled to the first heat exchanger via a refrigerant circuit, wherein the first heat exchanger exchanges heat with the air in the ventilation course while the second heat exchanger exchanges heat with air in the circulating air course;

a temperature sensor for sensing a temperature of the bathroom;

a controller configured to operatively control rotation of the ventilating fan and the circulating fan so that a rotation of the ventilating fan is decreased in accordance with the temperature of the bathroom, thereby increasing a difference in temperature between the air exchanging heat with the first heat exchanger and the air ventilated through the evacuating port so that heat dissipation loss can be reduced.

13. The bathroom air-conditioner of claim 12, further comprising a shutter plate disposed in the ventilation course for controlling an air volume of the air from the bathroom flowing to the controller.

14. The bathroom air-conditioner of claim 12, further comprising a partition for isolating the circulating air course from the ventilation course, wherein the first heating exchanger and the controller are disposed on a side of the partition providing the ventilation course, and the ventilating fan and the first heating exchanger are disposed in this order from the evacuating port, wherein air is drawn through an interior intake port, which is open to a room other than the bathroom, into the ventilation course.

15. The bathroom air-conditioner of claim 1, wherein the predetermined temperature increases by 5° C., a rpm (revolution per minute) of the ventilating fan is set at a first rpm until the temperature of the bathroom rises to a first predetermined temperature, and the controller reduces the rpm of the ventilating fan step-by-step with each 5° C. increase of the temperature of the bathroom.

16. The bathroom air-conditioner of claim 11, wherein the predetermined temperature reduces by 5° C., a rpm (revolution per minute) of the ventilating fan is set at a first rpm until the temperature of the bathroom rises to a first predetermined temperature, and the controller reduces the rpm of the ventilating fan step-by-step with each 5° C. decrease of the temperature of the bathroom.

17. The bathroom air-conditioner of claim 12, wherein the second heat exchanger does not exchange heat with air in the ventilation course.

18. The bathroom air-conditioner of claim 11, wherein the heat absorber does not exchange heat with air in the ventilation course.

19. The bathroom air-conditioner of claim 1, wherein the radiator does not exchange heat with air in the ventilation course.

* * * * *